United States Patent [19]
Sone et al.

[11] 4,113,377
[45] Sep. 12, 1978

[54] READER-PRINTER

[75] Inventors: Yoshiaki Sone, Tokyo; Takamasa Sawada, Yokohama; Masanari Shirai, Chigasaki, all of Japan

[73] Assignee: Canon Kabushiki Kaisha, Tokyo, Japan

[21] Appl. No.: 806,515

[22] Filed: Jun. 14, 1977

Related U.S. Application Data

[62] Division of Ser. No. 617,238, Sep. 26, 1976, Pat. No. 4,054,379.

[30] Foreign Application Priority Data

Sep. 28, 1974 [JP] Japan .................................. 49-111845

[51] Int. Cl.² .......................................... G03B 13/28
[52] U.S. Cl. ......................................... 355/45; 355/5
[58] Field of Search .................. 355/5, 44, 45, 43, 60, 355/65, 66; 354/152, 224, 225

[56] References Cited

U.S. PATENT DOCUMENTS

| | | | |
|---|---|---|---|
| 3,526,458 | 9/1970 | Meyers et al. | 355/45 |
| 3,765,759 | 10/1973 | Yamada | 355/45 |
| 3,865,484 | 2/1975 | Heldenbrand et al. | 355/45 |

*Primary Examiner*—Richard A. Wintercorn
*Attorney, Agent, or Firm*—Fitzpatrick, Cella, Harper & Scinto

[57] ABSTRACT

A reader-printer comprises a housing having a viewing opening, a screen disposed within the housing, means for moving the screen between an exposure position and a position spaced apart from the exposure position, means for projecting the image of a film onto the exposure position, means for feeding a copy sheet to the exposure position, means for delivering the copy sheet from the exposure position, and means for controlling external light entering the housing through the viewing opening.

24 Claims, 9 Drawing Figures

READER-PRINTER

This is a division of application Ser. No. 617,238, filed Sept. 26, 1976 now U.S. Pat. No. 4,054,379 issued Oct. 18, 1977.

BACKGROUND OF THE INVENTION

1. Field of the Invention

This invention relates to a reader-printer provided with a reflection type screen.

2. Description of Prior Art

The existing film readers for magnifying and projecting images recorded on microfilm are classified into two types according to their reading systems. One of the types is called the "transmission type" which uses a so-called transmission type screen comprising a light-diffusing layer provided on one surface of a plate formed of transparent glass or transparent acrylic resin, and in which a magnified image of the microfilm is projected upon the rear surface of the screen, while the light transmitted through the screen is read on the front surface of the screen. The other type is called the "reflection type" which uses a so-called reflection type screen comprising a flat plate having a light-diffusing surface like that of the movie screen, and in which a magnified image of the microfilm is projected upon the front surface of the screen, while the light reflected by the screen is read on the front surface of the screen. In the former type, the light transmission factor is poor due to the light-diffusing layer, on account of which the surface of the viewing screen is dark, and also as the diffusibility is low, the marginal area of the viewing screen is illegible unless the viewer shifts his eye position. Moreover, the surface of the viewing screen is so dazzling as to fatigue the eyes of the viewer. In contrast, the latter reflection type screen eliminates these disadvantages and makes it easier to view the image on the screen.

In any of the reader-printers provided with such screen, a rotatable mirror is provided to project an image of the films alternately onto the screen and the printing section, and, by rotating the mirror, the image is projected upon the screen for viewing, or printing by further projecting the image upon the printing section. This necessitates two optical paths, one leading from the mirror to the screen, and the other leading from the mirror to the printing screen. Moreover, when the image of the microfilm is to be magnified and projected, the optical paths become so long. As such, the entire device inevitably and disadvantageously becomes large-sized and complicated. A further disadvantage in these known devices is that since the mirror is moved, there takes place a deviation of the mirror from its proper position during its alternate image projections with the consequent halation of the projected images on the screen and the printing portion.

SUMMARY OF THE INVENTION

It is therefore an object of the present invention to provide a reader-printer which eliminates all the above-noted disadvantages.

It is another object of the present invention to provide an improved reader-printer which is provided with a reflection type screen.

It is still another object of the present invention to provide a reader-printer, in which a viewing station of a film image and a printing station are located at the same position.

The above objects, other objects, and the actual construction and functions of the present invention will become more fully apparent from the following detailed description of preferred embodiments thereof, when read in conjunction with the accompanying drawings.

DESCRIPTION OF THE PREFERRED EMBODIMENTS

Figure 1:
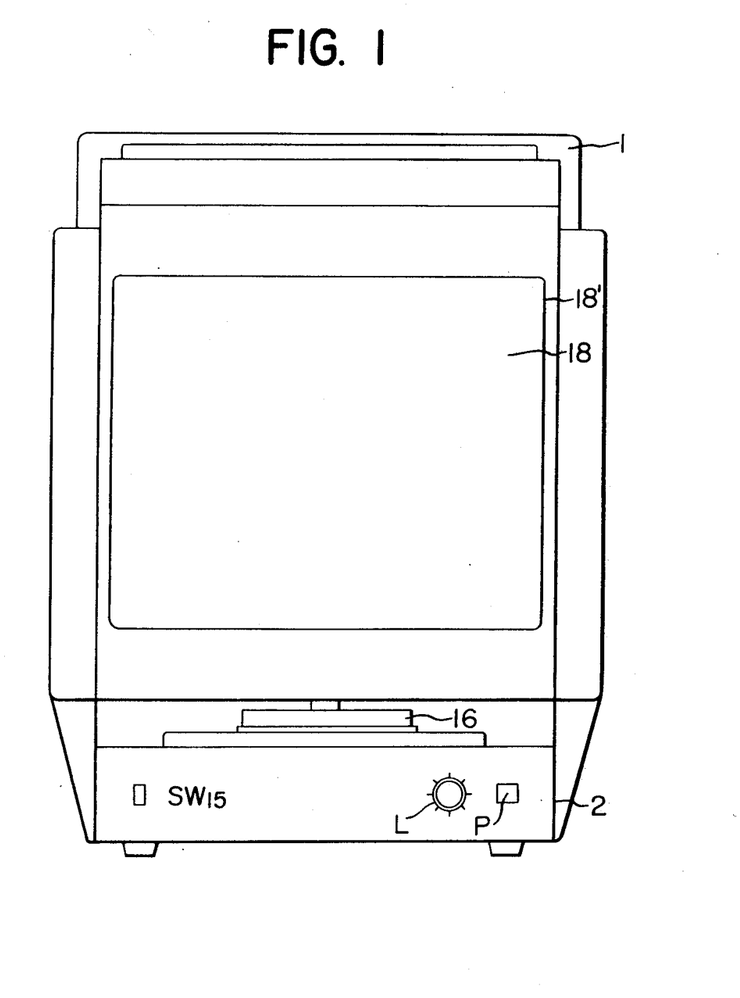
FIG. 1 is a front view showing one embodiment of the reader-printer according to the present invention.
Figure 2:
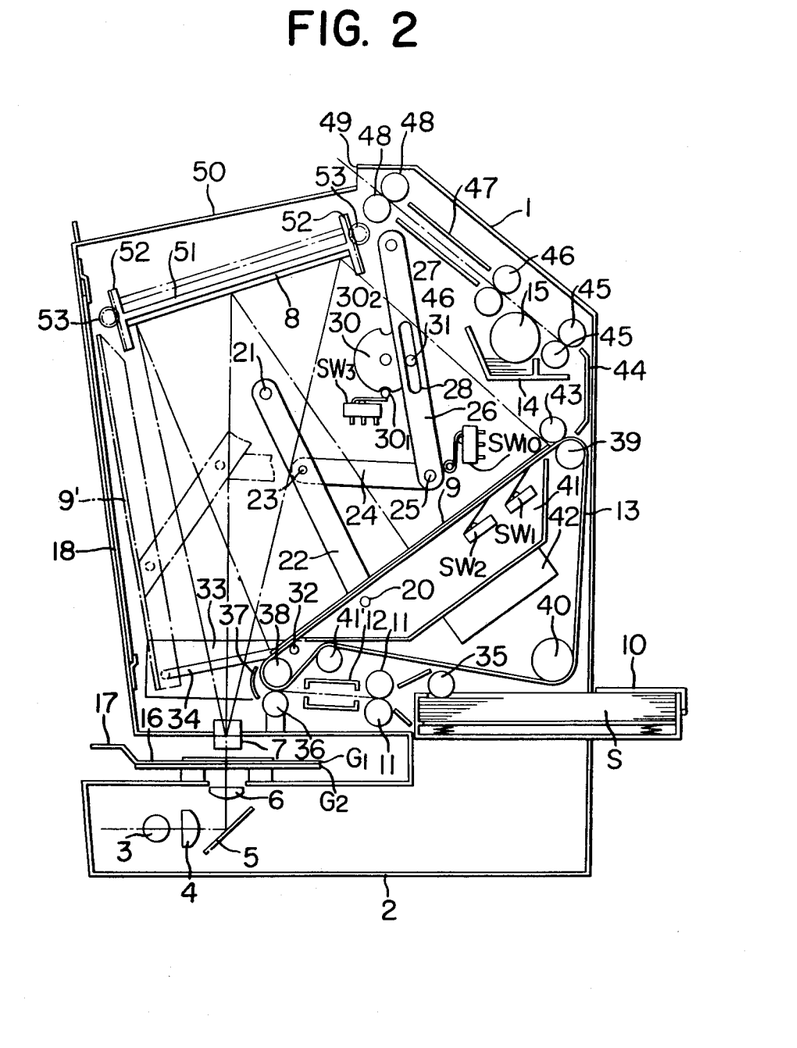
FIG. 2 is a cross-sectional view of the reader-printer shown in FIG. 1.

Referring to FIGS. 1 and 2, there is shown a reader-printer according to the present invention, which has a main body comprising an upper housing 1 and a lower housing 2. Disposed within the lower housing 2 is an illuminating means including a light source 3 such as a halogen lamp, a light converging lens 4, a reflecting mirror 5, another light converging lens 6, and so forth. In the front of the lower housing 2, there are provided a main switch $SW_{15}$, an exposure dial L for adjusting the quantity of light from the light source 3, and a print button P. The upper housing 1 accommodates therewithin optical projecting means having a projection lens 7, a mirror 8, and so on; print-out means having a reflection type screen 9 for receiving the light reflected from the mirror 8, a copy paper supply cassette 10, a set of transparent rollers 11, a charger 12, a copy paper conveying mechanism 13, and so on; and developing means having a developer tank 14, a developing roller 15, and so forth. The screen 9 is usually disposed at an inclined position within the housing 1, and formed by causing a sheet of paper or like material having a surface with a light-dispersing characteristic to adhere onto a rectangular base frame. A fiche carrier 16 which sustains two glass plates G1 and G2 holding a microfiche therebetween is disposed between the light converging lens 6 and the projection lens 7 in a movable manner on the lower housing 2. When the fiche carrier 16 is moved back and forth, or to the left and right as viewed in FIG. 1, by operating a moving handle 17, the microfiche displaces to the right or to the left, thereby enabling a desired image to be located on the projection light path.

Figure 4:
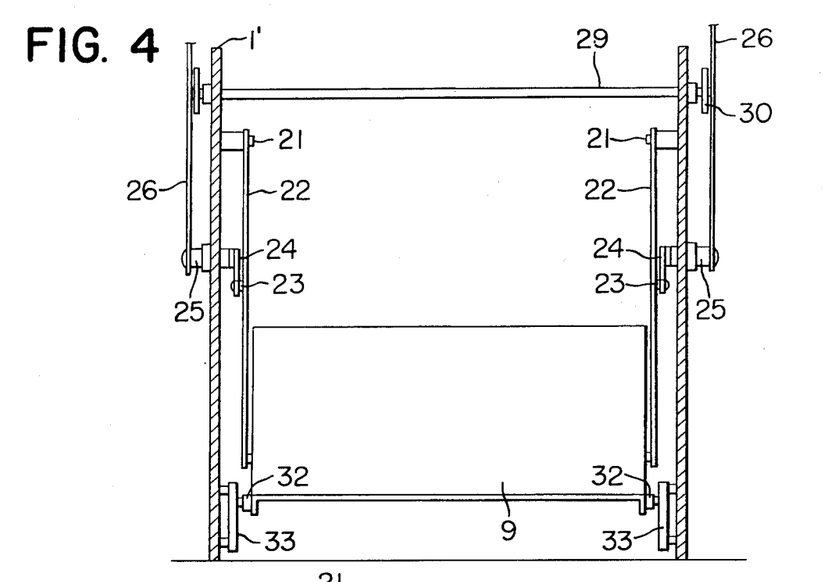
FIG. 4 illustrates a mechanism for moving the screen.
Figure 5:
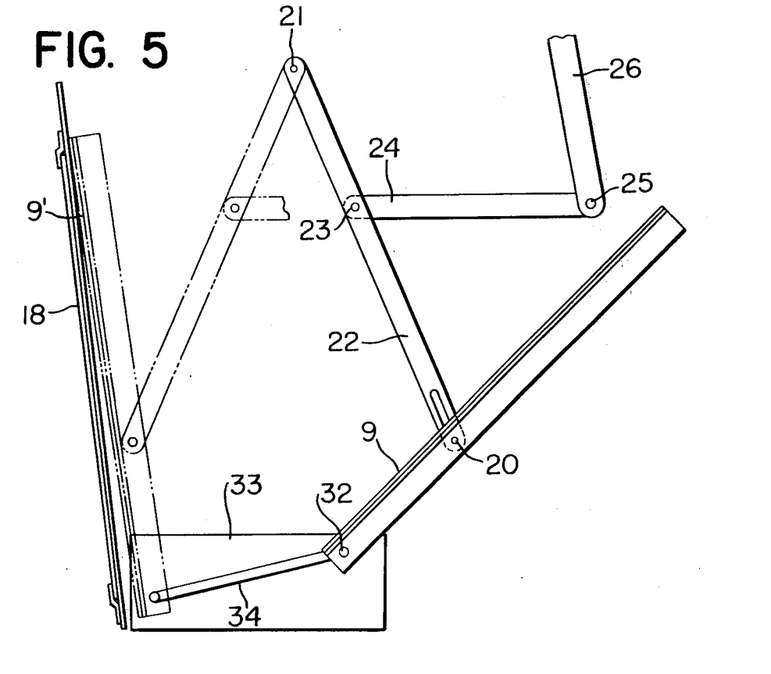
FIG. 5 is an enlarged side view of essential part of FIG. 4.
Figure 6:
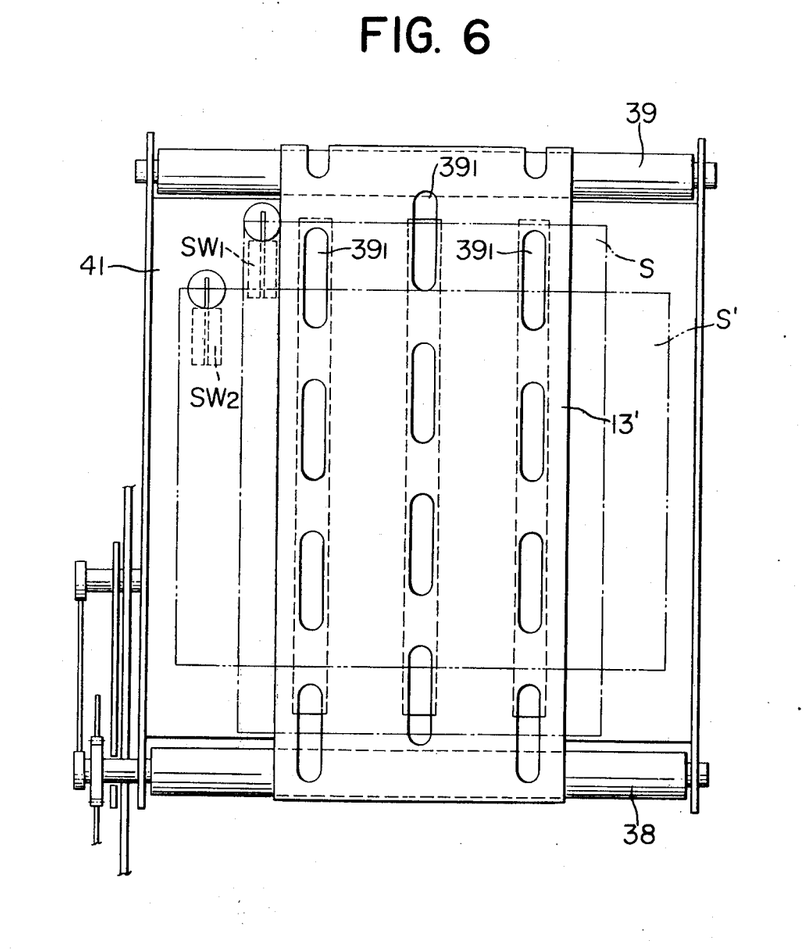
FIG. 6 shows a copy sheet conveyor mechanism.
Figure 7:
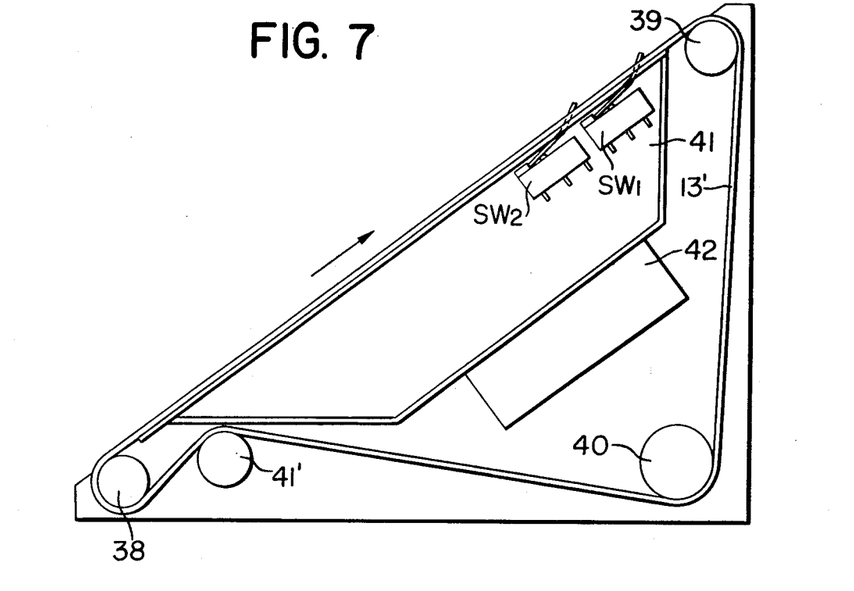
FIG. 7 is a side view corresponding to FIG. 6.

In the front wall of the upper housing, there is formed a viewing opening 18' dimensionally smaller than the screen 9. Filter means 18 is disposed at the opening 18'. Through the filter means 18', an operator may view the reflected light from the screen 9 to thereby read the projected image. The filter means 18 includes a density filter, and corrects the color temperature. It also optimizes the contrast of the image projected on the reflection type screen 9 when the viewer reads such image on the screen through the filter means 18 at the viewing opening 18'. The reflection type screen 9 is connected to a moving mechanism, and, at the time of printing, moves from the exposure position as indicated by solid line 9 in FIG. 2 to a position for masking the viewing opening as indicated by dot-and-dash line 9' by operation of the moving mechanism. The moving mechanism, as shown in FIGS. 4 and 5, has a first pair of levers 22 with each of one ends being freely rotatably mounted on a pin 20 studded on each side wall of the base frame for the screen 9, and with each of the other ends being freely rotatably mounted on a pivot pin 21 studded on each supporting wall 1' of the upper housing, a second pair of levers 24 with each of its one ends being freely rotatably connected to each one of the first pair of levers 22 by means of a pin 23, and a third pair of levers 26 freely rotatably connected to the second levers 24 by shafts 25 supported on the supporting walls 1'. The third levers 26 are freely rotatably mounted on pivot pins 27 studded in the supporting walls 1' of the upper housing 1, and at the same time, a slot 28 is formed in the intermediate portion of each lever 26. Pins 31 studded on the circumference of a cam disc 30 are received in and engaged with the slot 28 in each of the third pair of levers 26. Further, the cam disc 30 has notched portions 301, 302 formed in the peripheral portions thereof, and is coupled to a rotational shaft 29 connected to a motor M2 which rotates in one direction as will be described later. When the cam disc 30 is rotated by the operation of the motor M2, the third levers 26 oscillate on the pivot of the pin 27, as viewed in FIG. 2. On the other hand, a guide pin 32 is studded in the lower part of the side wall for the base plate of the screen 9 and is fitted in a slot 34 formed in a guide base plate 33. As the cam disc 30 is rotated clockwise by the motor M2 (see FIG. 3), at the time of the printing, the third levers 26 move leftwardly on the pivot of the pin 27, and the bottom end part of the screen 9 moves leftwardly along the slot 34 through the second levers 24 and the first levers 22. As the cam disc 30 is further rotated, the pin 32 on the screen 9 abuts against the terminal end of the slot 34, whereupon the upper end part of the screen 9 gradually cocks up, and, when the screen 9 comes to a position 9' shown by the dot-and-dash line in FIG. 2, the motor M2 is stopped by a signal from a microswitch SW3 which controls the operation of the motor M2, and the screen now in the dot-and-dash line position 9' closes the viewing opening 8' to intercept external light and darken the interior of the upper housing. It is to be noted that the inner walls of the housing 1 are painted in black. After completion of the printing, when the motor M2 is again started, the first levers 22 are rotated counter-clockwise on the pivot of the pin 21 with the result that the screen 9 restores to its original or exposure position. During its movement to that position, the screen 9 undergoes a displacing action at both ends thereof, so that it is always maintained flat to permit reading of the image or the interception of light to be effected in the optimum condition, whereby the screen can be smoothly moved to reduce its failures. Copy sheets S for electrophotography are accommodated in the feeding cassette 10. For this reproduction paper, there may be used electrofax paper prepared by coating zinc oxide onto a substrate paper having a conductive layer. At the time of printing, a sheet of the reproduction paper S in the feed cassette 10 is fed therefrom to the nip between the transport rollers 11 and 11 by means of a conventional paper feed roller 35. Having passed through the transport rollers 11 and 11, the reproduction paper S is uniformly charged by a pair of upper and lower double corona chargers 12, after which it passes between the guide rollers 36 and 38 to be guided onto the reproduction paper conveying mechanism 13 by the guide plate 37. The conveying mechanism 13, as shown in FIGS. 6 and 7, comprises an endless belt 13' of fabrics which is extended over rollers 38, 39 and a drive roller 40 so as to assume a rectangular configuration. Designated by a reference numeral 41' is a tension adjusting roller for the belt 13'. The endless belt 13' has a number of slots $39_1$ formed in a plurality of rows in the moving direction thereof. Inside the endless belt 13' in the triangular configuration, corresponding to the inclined side thereof, suction means 42 having a vacuum chamber 41 is disposed. When the reproduction sheet S is guided through the guide plate 37 onto the surface of the endless belt 13', the reproduction paper S is brought into intimate contact with the surface of the belt 13' by the suction force of the suction means 42, while it is guided by and conveyed on the belt to the exposure position, at which position the screen 9 was located before being displaced to the dot-and-dash line position 9', as previously noted. When the reproduction paper S becomes in contact with one of positioning switches SW1 and SW2 such as, for example, microswitches provided in the suction means 42, it is detected and the endless belt 13' stops moving. The switch SW1 becomes operable when the copy sheets S in the feeding cassette 10 are set with their long side being arranged in the longitudinal direction of the cassette, and the switch SW2 becomes operable when the copy sheets S are set with their short side being arranged in transverse to the longitudinal direction of the cassette. The screen 9 has a thickness of 1 mm or so, while the copy sheet S has a thickness of about 0.1 mm. The thicknesses are well within the depth of focus of the projection lens 7, so that, when the screen and the copy sheet are located at the exposure position (reading position), no focusing operation is required to be done between them. When the image of the microfiche is projected upon the copy sheet S located on the inclined side of the triangle of the endless belt 13', namely, at the exposure position, the endless belt 13' is again driven, and the copy sheet S, on which a latent image is formed, is passed between pinch rollers 43, after which it is separated from the belt 13', and guided to the nip between transport rollers 45 and 45 by a guide plate 44. Having passed between the transport rollers 45 and 45, the copy sheet S is developed by having applied thereonto a developing liquid for electrophotography using the developing roller 15 to develop the latent image thereon, whereupon it is introduced between guide plates 47 by transport rollers 46, 46, after which the copy sheet is discharged by discharge rollers 48, 48 through the outlet 49 of the upper housing 1 onto a tray 50 on top of the housing 1. The image formation process mentioned above is well-known, hence further details are dispensed with. Racks 52 are provided on both end parts of a support plate 51, on which the mirror 8 is mounted. These racks 52 are in meshing engagement with pinions 53 mounted on a shaft laterally extending within the upper housing 1, and by turning an operating knob disposed outside the housing 1 but directly connected to the shaft, the mirror 8 may generally be moved up and down to vary the length of the light path, hence, to vary the magnification of the projection.

As has been described in the foregoing, the viewing opening according to the present invention is designed to be closed by moving the image viewing screen, so that no large-sized mirror for intercepting external light as in the convention device is required any longer. Moreover, as the light weight screen is caused to move, the moving mechanism can be simplified, and smooth movement of the screen itself can be secured.

Figure 3:
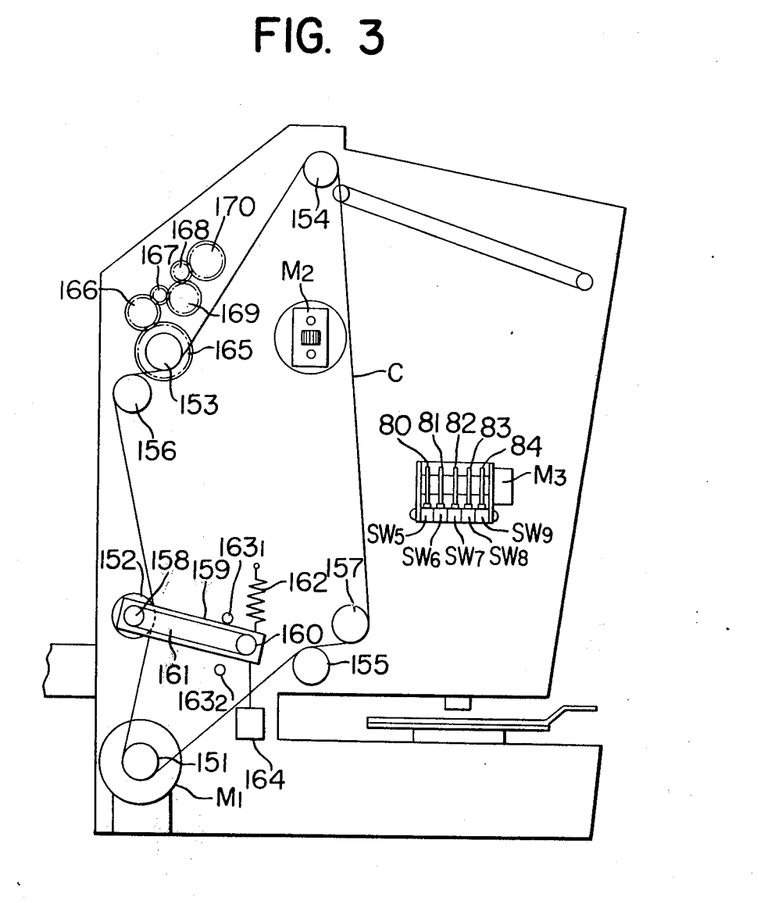
FIG. 3 illustrates a drive control mechanism.

FIG. 3 shows the drive control mechanism in the above-described reader-printer, wherein a chain C is extended over sprocket gears 151–155 and idler gears 156, 157, and is driven by the operation of a motor M1 connected with the rotational shaft of the sprocket gear 151. Another chain 161 is extended between and over a sprocket gear 158 mounted coaxially with the sprocket gear 152 and a sprocket gear 160 mounted at the tip end of an arm 159 freely rotatably mounted on the pivot of the sprocket gear 152. Thus, so long as the sprocket gear 152 rotates, other sprocket gears 158 and 160 also rotate. This tip end of the arm 159 is connected to one end of a coil spring 162, the other end of which is fixed on an inner wall of the housing. The arm 159 is normally biased for counterclockwise rotation by the action of the coil spring 162, and is engaged with an top stopper pin 163 to beat a position as indicated by a solid line.

The tip end of the arm 159 is also coupled to an electromagnet 164, and, when the electromagnet is energized, the arm 159 is rotated clockwise to be engaged with a bottom stopper pin $163_2$. The sprocket gear 160 is coupled to the paper feed roller 35, and, when the electromagnet 164 is unenergized, the paper feed roller 35 makes no contact with the stack of the copy sheets S. When the electromagnet 164 is energized, during the operation of the motor M1, the paper feed roller 35 contacts the stack of the copy sheets S to feed one sheet. Also, the sprocket gear 152 is connected to the drive roller 40 for driving the endless belt 13'. Another sprocket gear 153 is connected coaxially with a gear 165 for driving the developing means. The other sprocket gear 154 is connected to the discharge roller 48 to drive the same. Still another sprocket gear 155 is connected to the transport or advancing roller 11 to drive the same. The gear 165 connected coaxially with the sprocket gear 153 is in mesh-engagement with an intermediate gear 166, which, in turn, is connected with gears 169 and 170 through idler gears 167 and 168. In this case, the intermediate gear 166 is connected to the transport rollers 45 to drive the same, another gear 169 is connected to the developing roller 15 to drive the same, and still another gear 170 is connected to the transport roller 46 to drive the same. A motor M2 is connected to the cam disc 30 to drive the same in one direction, and, when this motor is started, and the actuator of the microswitch SW3 (see FIG. 2) which is engaged with the cam disc 30 is disengaged from the notched portion $30_1$ or $30_2$ of the cam disc, the microswitch SW3 is closed to cause the motor to self-lock and continue its driving. However, when the actuator of the microswitch SW3 is engaged in the notched portion $30_2$ and $30_1$, the microswitch SW3 is opened to deenergize the motor M2. That is, when the motor M2 continuously drives, the screen 9 is reciprocally moved between the exposure position and the intercepting position. Controls of operations of various mechanisms are performed by a group of cams 80–84 provided on the drive shaft of the motor M3, and a group of microswitches SW5–SW9 corresponding to these cams.

Figure 9:
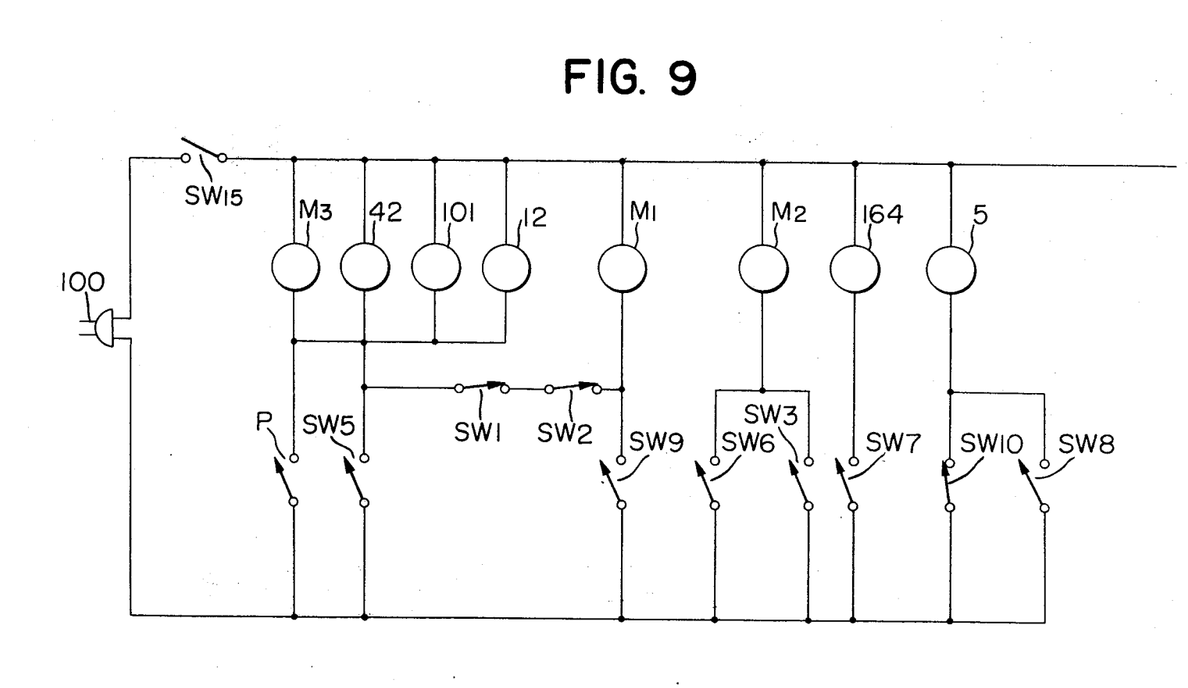
FIG. 9 shows an electric circuit for driving the reader-printer.

The electric circuit for the above-described reader-printer, as shown in FIG. 9, is provided with a terminal 100 for applying therethrough an AC voltage of 110 volts to energize the entire device. As soon as a main switch SW15 is closed, the light source 5 is turned "on," hence the switch SW10 is in closed position as shown in FIG. 9, so that the image of the film can be viewed on the screen 9, which is located at the exposure position.

If printing of the viewed image is desired, after the image of the microfiche has been read on the reflection type screen 9, the print button P is closed to turn the switch "on" to drive the motor M3. The motor continues to be driven until a self-lock cam 80 performs one complete rotation by closure of the microswitch SW5 corresponding to the cam 80. Upon closing of the microswitch SW5, the drive motor M1, suction means 42, charger 12 and developing liquid circulating pump 101 are operated. Subsequently, upon closure of the microswitch SW6 corresponding to the screen cam 81, the motor M2 starts, and the screen 9 is moved from the exposure position. When the microswitch SW3 is opened by the rotation of the cam disc 30, the screen comes to the position for closing the opening 18' and stops there. Immediately after the start of the motor M2, the microswitch SW6 is opened, but the motor M2 continues to be driven, because the switch SW3 is closed. When this occurs, the microswitch SW10 which is engaged with the second levers 26 is opened by the movement of the lever 26, whereby the light source 3 is turned off, and the interior of the upper housing 1 is darkened by the screen 9. Subsequently, the microswitch SW7 corresponding to the paper feed cam 82 is closed to energize the electromagnet 164, thereby bringing the paper feed roller 35 into contact with the stack of the copy sheets S to feed an image sheet. Since the drive motor M1 is in an energized condition, the copy sheet S charged by the charger 12 is fed onto the slant side of the endless belt 13' in triangular configuration, and, when the edge of the copy sheet becomes in contact with the switch SW1 or SW2, the motor M1 is deenergized by the signal from this switch to thereby stop the endless belt 13', and the copy sheet S is disposed at the predetermined exposure position. Next, the microswitch SW8 corresponding to the exposure cam 83 is closed to turn on the light source 3 for a predetermined time period to expose the copy sheet to image light. After the exposure, the microswitch SW9 corresponding to the feed cam 84 is closed to re-energize the drive motor M1, hence, to drive the endless belt 13', whereby the copy sheet S is transported upwardly. When the tip end of the copy sheet leaves the suction means 42 and passes through the pinch rollers 43, the copy sheet S is separated from the belt 13' so as to be guided along the guide plate 44 toward the developing station, because the tip end of the copy sheet is already free from the suction force. When the rear end of the copy sheet S leaves the positioning switch SW1 or SW2, the drive motor M1 continues to be energized by the signal from this switch. Thereafter, when the microswitch SW9 corresponding to the feed cam 84 is opened to terminate one complete rotation of the self-lock cam 80, thereby opening the switch SW5, the motor M3 and the drive motor M1 are simultaneously deenergized. Before the one complete rotation of the self-lock cam 80 terminates, the copy sheet S delivered into the developing station by the transport roller 45 is developed by the developing roller 15, after which the copy sheet is discharged onto the tray 50 by the discharge rollers 48, thus completing the printing. After the copy sheet S has been delivered to the developing station, and before the self-lock cam 80 has terminated one complete rotation, the switch SW6 corresponding to the screen cam 81 is again closed to re-start the motor M2, whereby the screen 9 is returned from its intercepting position to its initial or exposure position, thereby completing a cycle of copying operation. Upon restoration of the screen 9, the microswitch SW10 is closed to turn on the light source 5 again to permit the image to be viewed on the screen 9.

Figure 8:
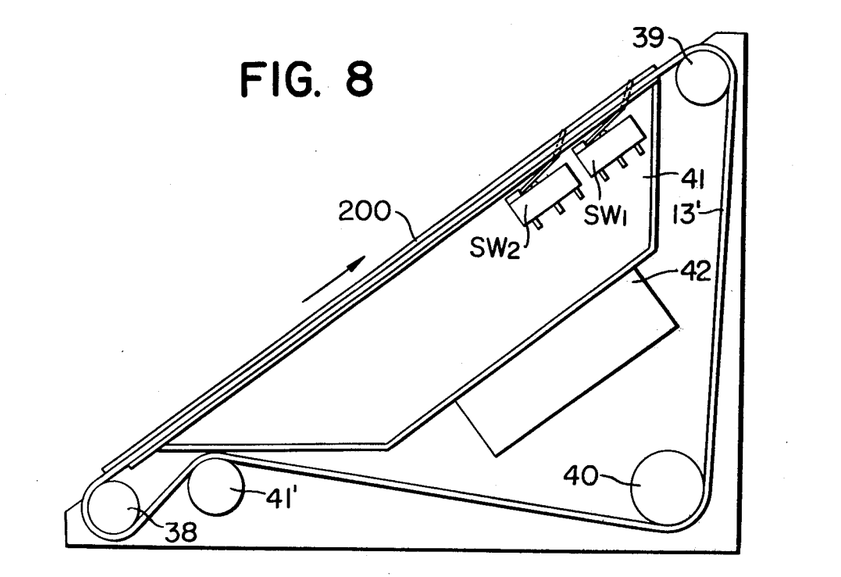
FIG. 8 shows another embodiment of the screen.

FIG. 8 shows another embodiment of the screen, wherein the reflection type screen 200 is provided on a portion of the endless belt 13' for conveying the copy sheet thereon. The remaining portion of the endless belt 13' is formed with slots. Thus, the screen 200 moves integrally with the endless belt 13' so that the screen and a copy sheet successively may come to the exposure position. The screen 200 may comprise white paper adhered to the endless belt, or light-diffusing material applied to the surface of the endless belt.

In the screen arrangement as shown in FIG. 8, two polarizing filters different in their polarization direction, or conventional shutter means such as door or the like may be provided at the opening 18' of the upper housing to open and close the opening with respect to the exterior of the device.

The printing method for use is not restricted to the electrofax system shown in the embodiment, but use may equally be made of any copying method such as silver salt copying, diazo copying, or the electrophotographic system employing ordinary paper.

Also, the microfilm used may be in the form of microfiche, rolled film, apertured card, strip film or the like.

While the present invention has been described with respect to some specific embodiments, it will be apparent that various changes or modifications may be made without departing from the purview and scope of the invention as defined in the appended claims.

What is claimed is:

1. A reader-printer comprising:
   a housing having a viewing opening formed therein;
   means for projecting an image to be read and printed along a light path formed in said housing;
   screen means for displaying said projected image for observation through said viewing opening, said screen means being movable between a first position in said light path and a second position outside said light path;
   means for conveying a reproduction material into said light path for exposure by said projected image; and
   means for selectively admitting and blocking the admission of external light through said viewing opening.

2. A reader-printer as claimed in claim 1, wherein said conveying means comprises a movable endless belt, and said screen means is connected to said endless belt.

3. A reader-printer as claimed in claim 2, wherein said screen means comprises a reflection surface formed on the surface of said endless belt.

4. A reader-printer as claimed in claim 2, wherein said endless belt includes means for holding said reproduction material thereon.

5. A reader-printer as claimed in claim 4, wherein said reproduction material holding means includes suction means.

6. A reader-printer as claimed in claim 1, wherein said image projecting means includes lens means for projecting said image in an enlarged scale along said light path.

7. A reader-printer as claimed in claim 6, further comprising movable reflecting means for varying the length of said light path.

8. A reader-printer as claimed in claim 1, wherein said device includes electrostatic charging means for imparting an electrostatic charge to said reproduction material.

9. A reader-printer as claimed in claim 8, wherein said device includes developing means for applying a developing agent to the exposed reproduction material.

10. A reader-printer as claimed in claim 1, wherein said screen means is a reflection type screen.

11. A reader-printer comprising:
    a housing having a viewing opening formed therein;
    means for projecting an image to be read and printed along a light path formed in said housing;
    screen means for displaying said image for observation through said viewing opening, said screen means being movable into and outside said light path;
    means for forwarding a photosensitive body into said light path for exposure by said projected image; and
    means for causing said movements of said screen means and said photosensitive body to be mutually associated.

12. A reader-printer as claimed in claim 11, wherein said associating means includes means for connecting said screen means with said feeding means so as to forward said photosensitive body into said light path in association with movement of said screen means outside said light path.

13. A reader-printer as claimed in claim 11, further comprising means for selectively admitting and blocking the admission of external light through said viewing opening.

14. A recording device comprising:
    a housing having a viewing window formed therein;
    means for projecting an image to be printed into a recording position formed in said housing;
    means for forwarding a recording medium to said recording position;
    screen means for displaying said projected image for observation through said viewing window;
    means for forwarding said screen means to said recording position; and
    means for selectively admitting and blocking the admission of external light through said viewing window.

15. The recording device as claimed in claim 14, in which said selective means admits external light in the case of an image observing mode, and intercepts said external light in the case of an image recording mode.

16. A reproduction device comprising:
    a casing enclosing said device;
    a viewing window formed in said casing;
    means for causing an image forming member to move along a predetermined image forming path disposed in said casing;
    latent image forming means including means for projecting an image onto an exposure position disposed in said path;
    developing means disposed in a developing position along said path so as to develop a latent image formed on said image forming member;
    screen means for displaying said image at said exposure position for observation through said viewing window;

means for forwarding said screen means to said exposure position; and means for selectively admitting and blocking the admission of external light through said viewing window.

17. A reproduction device comprising:

a casing enclosing said device;

a viewing window formed in said casing;

lens means for projecting an image into an exposure position in said casing;

means forming a light path extending from said projecting lens means to said exposure position; p1 an endless belt disposed at said exposure position;

means for driving said endless belt;

screen means movable in association with said endless belt for displaying said image at said exposure position;

an image forming member movable in association with said endless belt; and means for selectively admitting and blocking the admission of external light through said viewing window.

18. An image observing and reproducing device which is operable in separate image observation and image reproduction modes, said device comprising:

a housing;

a viewing opening formed in said housing;

lens means for focusing an image onto an exposure surface in said housing;

means forming a light path extending from said lens means to said exposure surface;

screen means for displaying the focused image for viewing through said window, wherein said screen means is positioned at the exposure surface when the device is in the image observing mode, and positioned outside the light path when the device is in the image reproducing mode;

means for feeding a photosensitive body to the position of said exposure surface; and means for selectively admitting and blocking the admission of external light through said viewing opening.

19. A device as claimed in claim 18, further comprising:

a film carrying an image thereon;

means for illuminating said film, wherein said lens means focuses said film image onto said exposure surface; and means for controlling operation of said illuminating means in response to the position of said screen means, said controlling means being connected to said screen means and said illuminating means.

20. A device as claimed in claim 18, further comprising:

means for exposing the exposure surface with the image; and means for controlling operation of said exposing means to effect said exposure when said screen means is positioned outside said light path and the photosensitive body is disposed at the exposure surface.

21. A reader-printer as claimed in claim 1, wherein means for selectively admitting and blocking external light comprises shutter means disposed to open and close said viewing opening.

22. A reader-printer as claimed in claim 21, wherein said shutter means comprises a polarizing filter disposed at said viewing opening.

23. A reader-printer as claimed in claim 21, wherein said shutter means comprises movable doors mounted at said viewing opening.

24. A device as claimed in claim 18, wherein said means for selectively admitting and blocking external light comprises shutter means disposed at said viewing opening.

* * * * *

UNITED STATES PATENT OFFICE
CERTIFICATE OF CORRECTION

Patent No. 4,113,377                    Dated September 12, 1978

Inventor(s) YOSHIAKI SONE, ET AL.

It is certified that error appears in the above-identified patent and that said Letters Patent are hereby corrected as shown below:

| | |
|---|---|
| Column 1, line 49 | Change "screen" to --section--. |
| Column 2, line 41 | Change "transparent" to --transport--. |
| Column 9, line 12 | After "position;", delete "pl". |

Signed and Sealed this

Seventh Day of November 1978

[SEAL]

Attest:

RUTH C. MASON
Attesting Officer

DONALD W. BANNER
Commissioner of Patents and Trademarks